(12) United States Patent
Kim et al.

(10) Patent No.: US 11,697,731 B2
(45) Date of Patent: Jul. 11, 2023

(54) THERMOPLASTIC RESIN COMPOSITION AND MOLDED ARTICLE USING SAME

(71) Applicant: LOTTE CHEMICAL CORPORATION, Seoul (KR)

(72) Inventors: Myunghun Kim, Uiwang-si (KR); Keehae Kwon, Uiwang-si (KR); Jaekeun Hong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 210 days.

(21) Appl. No.: 17/298,102

(22) PCT Filed: Nov. 27, 2019

(86) PCT No.: PCT/KR2019/016482
§ 371 (c)(1),
(2) Date: May 28, 2021

(87) PCT Pub. No.: WO2020/111778
PCT Pub. Date: Jun. 4, 2020

(65) Prior Publication Data
US 2022/0106482 A1   Apr. 7, 2022

(30) Foreign Application Priority Data
Nov. 29, 2018   (KR) .................. 10-2018-0151203

(51) Int. Cl.
| | | |
|---|---|---|
| *C08L 69/00* | (2006.01) | |
| *C08L 25/12* | (2006.01) | |
| *C08L 67/02* | (2006.01) | |
| *C08L 51/04* | (2006.01) | |
| *C08K 5/521* | (2006.01) | |
| *C08K 3/34* | (2006.01) | |

(52) U.S. Cl.
CPC ............... *C08L 69/00* (2013.01); *C08K 3/34* (2013.01); *C08K 5/521* (2013.01); *C08L 25/12* (2013.01); *C08L 51/04* (2013.01); *C08L 67/02* (2013.01); *C08L 2201/08* (2013.01); *C08L 2205/03* (2013.01)

(58) Field of Classification Search
None
See application file for complete search history.

(56) References Cited

U.S. PATENT DOCUMENTS

| | | |
|---|---|---|
| 6,512,077 B1 | 1/2003 | Miyamoto et al. |
| 8,883,878 B2 | 11/2014 | Volkers et al. |
| 9,580,597 B2 | 2/2017 | Jeong et al. |
| 9,718,958 B2 | 8/2017 | Son et al. |
| 9,745,417 B2 | 8/2017 | Hwang et al. |
| 9,745,466 B2 | 8/2017 | Park et al. |
| 9,751,979 B2 | 9/2017 | Son et al. |
| 9,777,112 B2 | 10/2017 | Park et al. |
| 9,809,677 B2 | 11/2017 | Park et al. |
| 9,840,585 B2 | 12/2017 | Park et al. |
| 9,868,818 B2 | 1/2018 | Park et al. |
| 9,902,853 B2 | 2/2018 | Hwang et al. |
| 10,240,039 B2 | 3/2019 | Li et al. |
| 10,358,553 B2 | 7/2019 | Jung et al. |
| 2003/0083419 A1 | 5/2003 | Seidel et al. |
| 2004/0178383 A1 | 9/2004 | Kikuchi |
| 2007/0093591 A1 | 4/2007 | Ma et al. |
| 2008/0176048 A1 | 7/2008 | Onizawa et al. |
| 2009/0036593 A1 | 2/2009 | DeRudder et al. |
| 2010/0152358 A1 | 6/2010 | Jung et al. |
| 2010/0168311 A1 | 7/2010 | Jansen et al. |
| 2012/0245262 A1 | 9/2012 | Hao et al. |
| 2012/0289655 A1 | 11/2012 | Sumita et al. |
| 2014/0187702 A1 | 7/2014 | Lee et al. |
| 2014/0275366 A1 | 9/2014 | Chirino et al. |
| 2014/0357769 A1 | 12/2014 | Zheng et al. |
| 2014/0378598 A1 | 12/2014 | Park et al. |
| 2015/0080515 A1 | 3/2015 | Daga et al. |
| 2015/0166888 A1 | 6/2015 | Katsumoto et al. |
| 2016/0319127 A1 | 11/2016 | Jeong et al. |
| 2016/0326312 A1 | 11/2016 | Park et al. |
| 2016/0326313 A1 | 11/2016 | Son et al. |

(Continued)

FOREIGN PATENT DOCUMENTS

| | | |
|---|---|---|
| CN | 1346386 A | 4/2002 |
| CN | 1413228 A | 4/2003 |

(Continued)

OTHER PUBLICATIONS

Final Office Action in commonly owned U.S. Appl. No. 16/583,501, dated Oct. 25, 2021, pp. 1-10.
Extended European Search Report in counterpart European Application No. 19891038.2 dated Jul. 18, 2022, pp. 1-6.
Office Action dated Jul. 6, 2021, in commonly owned Chinese Application No. 201910924371.1 and accompanying Search Report dated Jun. 28, 2021, pp. 1-9.
English-translation of Office Action dated Jul. 6, 2021, in commonly owned Chinese Application No. 201910924371.1, pp. 1-7.
International Search Report in counterpart International Application No. PCT/KR2019/016482 dated Mar. 18, 2020, pp. 1-6.

(Continued)

*Primary Examiner* — David J Buttner
(74) *Attorney, Agent, or Firm* — Additon, Pendleton & Witherspoon, P.A.

(57) ABSTRACT

The present invention relates to a thermoplastic resin composition and a molded article using same, the thermoplastic resin composition comprising: (D) 4 to 12 parts by weight of a methyl methacrylate-butadiene-styrene graft copolymer; (E) 0.1 to 0.3 parts by weight of a phosphate-based heat stabilizer; and (F) 25 to 35 parts by weight of an inorganic filler having an average particle diameter (D50) of 1 to 5 μm, with respect to 100 parts by weight of a basic resin including (A) 65 to 75 wt % of a polycarbonate, (B) 20 to 30 wt % of an aromatic vinyl-cyanized vinyl copolymer; and (C) 1 to 10 wt % of a polyethylene terephthalate resin.

12 Claims, 3 Drawing Sheets

(56) References Cited

U.S. PATENT DOCUMENTS

| | | |
|---|---|---|
| 2016/0326314 A1 | 11/2016 | Son et al. |
| 2016/0326321 A1 | 11/2016 | Park et al. |
| 2016/0369047 A1 | 12/2016 | Hwang et al. |
| 2016/0369048 A1 | 12/2016 | Park et al. |
| 2016/0369095 A1 | 12/2016 | Park et al. |
| 2016/0376405 A1 | 12/2016 | Park et al. |
| 2017/0002195 A1 | 1/2017 | Wei et al. |
| 2017/0137568 A1 | 5/2017 | Chun et al. |
| 2017/0158852 A1 | 6/2017 | Ko et al. |
| 2017/0190833 A1 | 7/2017 | Hwang et al. |
| 2017/0275456 A1 | 9/2017 | Hwang et al. |
| 2017/0292019 A1 | 10/2017 | Lee et al. |
| 2017/0298221 A1 | 10/2017 | Son et al. |
| 2017/0298222 A1 | 10/2017 | Lee et al. |
| 2017/0306146 A1 | 10/2017 | Lee et al. |
| 2017/0313870 A1 | 11/2017 | Kim et al. |
| 2017/0321014 A1 | 11/2017 | Lee et al. |
| 2018/0187005 A1 | 7/2018 | Kim et al. |
| 2018/0230305 A1 | 8/2018 | Okamoto et al. |
| 2019/0322862 A1 | 10/2019 | Kim et al. |
| 2020/0048457 A1* | 2/2020 | Ueda ............... C08L 33/24 |
| 2020/0102455 A1 | 4/2020 | Kim et al. |

FOREIGN PATENT DOCUMENTS

| | | |
|---|---|---|
| CN | 101248138 A | 8/2008 |
| CN | 101809085 A | 8/2010 |
| CN | 102272194 A | 12/2011 |
| CN | 103242637 A | 8/2013 |
| CN | 107075242 A | 8/2017 |
| JP | 2004-002737 A | 1/2004 |
| JP | 2010-070590 A | 4/2010 |
| JP | 2013-018938 A | 1/2013 |
| JP | 2013-112752 | 6/2013 |
| JP | 2015-108075 | 6/2015 |
| JP | 5875945 | 3/2016 |
| JP | 2018-159003 A | 10/2018 |
| KR | 10-1995-0001641 A | 2/1995 |
| KR | 10-2007-0120104 A | 12/2007 |
| KR | 10-0937820 B1 | 1/2010 |
| KR | 10-2010-0070005 A | 6/2010 |
| KR | 10-2013-0074365 A | 7/2013 |
| KR | 10-2014-0022835 A | 2/2014 |
| KR | 10-2014-0084693 A | 7/2014 |
| KR | 10-2014-0091722 | 7/2014 |
| KR | 10-2015-0054036 A | 5/2015 |
| KR | 10-2016-0016963 A | 2/2016 |
| KR | 10-2016-0060906 A | 5/2016 |
| KR | 10-2016-0067788 A | 6/2016 |
| KR | 10-2016-0069129 A | 6/2016 |
| KR | 10-2016-0078609 A | 7/2016 |
| KR | 10-2016-0129746 A | 11/2016 |
| KR | 10-2016-0130701 A | 11/2016 |
| KR | 10-2016-0130764 A | 11/2016 |
| KR | 10-1743803 | 6/2017 |
| KR | 10-2018-0039072 | 4/2018 |
| KR | 10-2018-0078895 | 7/2018 |
| KR | 10-2018-0079173 A | 7/2018 |
| KR | 10-2018-0079200 A | 7/2018 |
| KR | 10-2018-0088060 | 8/2018 |
| KR | 10-2017-0084296 | 3/2019 |
| WO | 2020/111778 A1 | 6/2020 |

OTHER PUBLICATIONS

Imerys Talc, "Jetfine 3 C A" Product Data Sheet Oct. 2011, pp. 1.
Non-Final Office Action in commonly owned U.S. Appl. No. 16/583,501, dated Jul. 7, 2021, pp. 1-9.

* cited by examiner

THERMOPLASTIC RESIN COMPOSITION AND MOLDED ARTICLE USING SAME

CROSS-REFERENCE TO RELATED APPLICATIONS

This application claims priority to and the benefit of International Application No. PCT/KR2019/016482, filed Nov. 27, 2019, which published as WO 2020/111778 on Jun. 4, 2020, and Korean Patent Application No. 10-2018-0151203, filed in the Korean Intellectual Property Office on Nov. 29, 2018, the entire disclosure of each of which is incorporated herein by reference.

TECHNICAL FIELD

A thermoplastic resin composition and a molded article using the same are disclosed.

BACKGROUND ART

A polycarbonate resin is one of engineering plastics, which is a material widely used in the plastic industry.

As the polycarbonate resin has a glass transition temperature (Tg) of about 150° C. due to the bulk molecular structure such as bisphenol-A, which shows a high heat resistance, and the carbonyl group of the carbonate group has a high rotational mobility to provide the polycarbonate resin with flexibility and rigidity. In addition, it is an amorphous polymer having excellent transparency.

Furthermore, although having excellent impact resistance and compatibility with other resins, the polycarbonate resin has a drawback of low fluidity, so it is frequently used in a form of an alloy with the various resins for complementing moldability and post-processability.

Among them, a polycarbonate/acrylonitrile-butadiene-styrene copolymer (PC/ABS) alloy has excellent durability, moldability, heat resistance, impact resistance, dimensional stability, and the like, and thus may be applied in a wide range of applications such as electric/electronic field, automobile field, construction field, and other living materials.

Meanwhile, an inorganic filler is sometimes added to the PC/ABS alloy in order to enhance a dimensional stability, causing that metal ions included in the inorganic filler may decompose the PC resin, so as to deteriorate appearance and impact resistance of the PC/ABS alloy.

Accordingly, in order to solve the problem, it is needed to develop a thermoplastic resin composition having improved impact resistance, appearance, and dimensional stability, compared with the conventional PC/ABS alloy including inorganic filler.

DISCLOSURE

Technical Problem

A thermoplastic resin composition having improved impact resistance, heat resistance, appearance, and dimensional stability, and a molded article using the same are provided.

Technical Solution

According to an embodiment, a thermoplastic resin composition comprises 100 parts by weight of a base resin comprising (A) 65 to 75 wt % of a polycarbonate resin; (B) 20 to 30 wt % of an aromatic vinyl-vinyl cyanide copolymer; and (C) 1 to 10 wt % of a polyethylene terephthalate resin and (D) 4 to 12 parts by weight of a methyl methacrylate-butadiene-styrene graft copolymer; (E) 0.1 to 0.3 parts by weight of a phosphate-based heat stabilizer and (F) 25 to 35 parts by weight of an inorganic filler having an average particle diameter (D50) of 1 to 5 μm based on 100 parts by weight of the base resin.

The (A) polycarbonate resin may have a melt flow index of 15 to 25 g/10 min measured under the condition of 300° C. and 1.2 kg load according to ASTM D1238.

The (B) aromatic vinyl-vinyl cyanide copolymer may be a copolymer of a monomer mixture including 60 to 80 wt % of an aromatic vinyl compound and 20 to 40 wt % of a vinyl cyanide compound.

The (B) aromatic vinyl-vinyl cyanide copolymer may have a weight average molecular weight of 80,000 to 200,000 g/mol.

The (B) aromatic vinyl-vinyl cyanide copolymer may be a styrene-acrylonitrile copolymer.

The (C) polyethylene terephthalate resin may have an intrinsic viscosity measured according to ASTM D2857 of less than or equal to 1.0 dl/g.

The (D) methyl methacrylate-butadiene-styrene graft copolymer may have a core-shell structure including a core composed of a butadiene-based rubbery polymer, and a shell formed by graft polymerization of methyl methacrylate and/or styrene on the core.

The butadiene-based rubbery polymer of the (D) methyl methacrylate-butadiene-styrene graft copolymer may have an average particle diameter of 100 to 400 nm.

The (E) phosphate-based heat stabilizer may include dihydrogen phosphate, stearyl phosphate, trimethyl phosphate, triethyl phosphate, triphenyl phosphate, or a combination thereof.

The (F) inorganic filler may include montmorillonite, talc, kaolin, zeolite, vermiculite, aluminum oxide, silica, magnesium hydroxide, aluminum hydroxide, glass flakes, or a combination thereof.

The thermoplastic resin composition may further include at least one additive selected from a flame retardant, a nucleating agent, a coupling agent, a glass fiber, a plasticizer, a lubricant, an antibacterial agent, a release agent, an antioxidant, an ultraviolet stabilizer, an antistatic agent, a pigment, and a dye.

Meanwhile, a molded article using a thermoplastic resin composition according to an embodiment may be provided.

Advantageous Effects

The thermoplastic resin composition according to an embodiment and a molded article using the same may be widely applied to the molding of various products used for painting or non-painting due to improved impact resistance, heat resistance, appearance and dimensional stability. In particular, it may be usefully used for applications such as automobile interior/exterior materials.

MODE FOR INVENTION

Hereinafter, embodiments of the present invention are described in detail. However, these embodiments are exemplary, the present invention is not limited thereto, and the present invention is defined by the scope of claims.

In the present invention, unless otherwise mentioned, the average particle diameter refers to a volume average diameter, and means a Z-average particle diameter measured using a dynamic light scattering analyzer.

A thermoplastic resin composition includes 100 parts by weight of a base resin comprising (A) 65 to 75 wt % of a polycarbonate resin; (B) 20 to 30 wt % of an aromatic vinyl-vinyl cyanide copolymer; and (C) 1 to 10 wt % of a polyethylene terephthalate resin and (D) 4 to 12 parts by weight of a methyl methacrylate-butadiene-styrene graft copolymer; (E) 0.1 to 0.3 parts by weight of a phosphate-based heat stabilizer and (F) 25 to 35 parts by weight of an inorganic filler having an average particle diameter (D50) of 1 to 5 μm based on 100 parts by weight of the base resin.

Hereinafter, each component included in the thermoplastic resin composition will be described in detail.

(A) Polycarbonate Resin

The polycarbonate resin is a polyester having a carbonate bond but has no particular limit in its type, and may include any polycarbonate resin usable in resin composition field.

For example, it may be prepared by reacting diphenols represented by Chemical Formula 1 with a compound selected from phosgene, halogen acid esters, carbonate esters, and a combination thereof.

[Chemical Formula 1]

In Chemical Formula 1,

A is a linking group selected from a single bond, a substituted or unsubstituted C1 to C30 alkylene group, a substituted or unsubstituted C2 to C5 alkenylene group, a substituted or unsubstituted C2 to C5 alkylidene group, a substituted or unsubstituted C1 to C30 haloalkylene group, a substituted or unsubstituted C5 to C6 cycloalkylene group, a substituted or unsubstituted C5 to C6 cycloalkenylene group, a substituted or unsubstituted C5 to C10 cycloalkylidene group, a substituted or unsubstituted C6 to C30 arylene group, a substituted or unsubstituted C1 to C20 alkoxylene group, a halogenic acid ester group, carbonate ester group, CO, S, and $SO_2$, $R^1$ and $R^2$ are each independently a substituted or unsubstituted C1 to C30 alkyl group or a substituted or unsubstituted C6 to C30 aryl group, and n1 and n2 are each independently an integer of 0 to 4.

Two or more types of the diphenols represented by Chemical Formula 1 may be combined to constitute a repeating unit of the polycarbonate resin.

Specific examples of the diphenols may be hydroquinone, resorcinol, 4,4'-dihydroxydiphenyl, 2,2-bis(4-hydroxyphenyl)propane (also referred to as "bisphenol-A"), 2,4-bis(4-hydroxyphenyl)-2-methylbutane, bis(4-hydroxyphenyl) methane, 1,1-bis(4-hydroxyphenyl)cyclohexane, 2,2-bis(3-chloro-4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like. Of the diphenols, 2,2-bis(4-hydroxyphenyl) propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, or 1,1-bis(4-hydroxyphenyl)cyclohexane may be desirably used. 2,2-bis (4-hydroxyphenyl)propane may be more desirably used.

The polycarbonate resin may be a mixture of copolymers obtained using two or more dipenols.

In addition, the polycarbonate resin may be a linear polycarbonate resin, a branched polycarbonate resin, a polyestercarbonate copolymer resin, and the like.

Specific examples of the linear polycarbonate resin may be a bisphenol-A polycarbonate resin. Specific examples of the branched polycarbonate resin may be a resin prepared by reacting a multi-functional aromatic compound such as trimellitic anhydride, trimellitic acid, and the like with diphenols and a carbonate. The polyestercarbonate copolymer resin may be prepared by reacting bifunctional carboxylic acid with diphenols and carbonate, wherein the used carbonate is diaryl carbonate such as diphenyl carbonate or ethylene carbonate.

The polycarbonate resin may have a weight average molecular weight of 10,000 to 200,000 g/mol, and for example, the polycarbonate resin may have a weight average molecular weight of 14,000 to 40,000 g/mol. When the weight average molecular weight of the polycarbonate resin is within the above range, a molded article using the same may obtain excellent impact resistance and fluidity.

The polycarbonate resin may be included in an amount of 65 to 75 wt %, and for example, may be included in an amount of 68 to 73 wt % based on 100 wt % of the base resin. When the polycarbonate resin is less than 65 wt %, mechanical strength is not good, and when it exceeds 75 wt %, moldability may be deteriorated.

The polycarbonate resin may have a melt flow index of 15 to 25 g/10 min, for example greater than or equal to 15 g/10 min, for example greater than or equal to 16 g/10 min, and for example less than or equal to 25 g/10 min, for example less than or equal to 20 g/10 min, for example 15 to 25 g/10 min, for example 16 to 20 g/10 min, which is measured under the condition of 300° C. and 1.2 kg load according to ASTM D1238. When the polycarbonate resin having a melt flow index within the above range is used, a molded article using the same may obtain excellent impact resistance and fluidity.

However, an embodiment is not necessarily limited thereto. For example, the polycarbonate resin may be used by mixing two or more types of polycarbonate resins having different weight average molecular weight or melt flow index. By mixing and using polycarbonate resins of different weight average molecular weight or melt flow index, the thermoplastic resin composition may be controlled to have desired fluidity.

(B) Aromatic Vinyl-Vinyl Cyanide Copolymer

In an embodiment, the aromatic vinyl-vinyl cyanide copolymer performs a function of improving the fluidity of the thermoplastic resin composition and maintaining compatibility between components at a certain level.

In an embodiment, the aromatic vinyl-cyanide vinyl copolymer may be a copolymer of an aromatic vinyl compound and a vinyl cyanide compound. The aromatic vinyl-vinyl cyanide copolymer may have a weight average molecular weight of greater than or equal to 80,000 g/mol, for example greater than or equal to 85,000 g/mol, for example greater than or equal to 90,000 g/mol, and for example less than or equal to 200,000 g/mol, for example less than or equal to 150,000 g/mol, for example 80,000 g/mol to 200,000 g/mol, for example 80,000 g/mol to 150,000 g/mol.

In the present invention, the weight average molecular weight is measured by dissolving a powder sample in tetrahydrofuran (THF) and then using Agilent Technologies' 1200 series gel permeation chromatography (GPC) (column is LF-804 of Shodex and the standard sample is polystyrene of Shodex).

The aromatic vinyl compound may be at least one selected from styrene, α-methylstyrene, p-methylstyrene, p-t-butylstyrene, 2,4-dimethylstyrene, chlorostyrene, vinyltoluene, and vinylnaphthalene.

The vinyl cyanide compound may be at least one selected from acrylonitrile, methacrylonitrile, and fumaronitrile.

In an embodiment, the aromatic vinyl-vinyl cyanide copolymer may be a copolymer of a monomer mixture including an aromatic vinyl compound and a vinyl cyanide compound.

In this case, based on 100 wt % of the aromatic vinyl-vinyl cyanide copolymer, the component derived from the aromatic vinyl compound may be included, for example, in an amount of greater than or equal to 60 wt %, for example, greater than or equal to 65 wt %, and for example less than or equal to 80 wt %, for example, less than or equal to 75 wt %, for example, 60 to 80 wt %, for example 65 to 75 wt %.

In addition, based on 100 wt % of the aromatic vinyl-vinyl cyanide copolymer, the component derived from the vinyl cyanide compound may be included, for example, greater than or equal to 20 wt %, for example, greater than or equal to 25 wt %, and for example less than or equal to 40 wt %, for example, less than or equal to 35 wt %, for example, 20 to 40 wt %, for example, 25 to 35 wt %.

In an embodiment, the aromatic vinyl-vinyl cyanide copolymer may be a styrene-acrylonitrile copolymer (SAN).

In an embodiment, the aromatic vinyl-vinyl cyanide copolymer may be included in an amount of greater than or equal to 20 wt %, for example greater than or equal to 22 wt %, and for example, less than or equal to 30 wt %, for example less than or equal to 29 wt %, for example, less than or equal to 28 wt %, for example, 20 to 30 wt %, for example 22 to 29 wt %, for example 22 to 28 wt % based on 100 wt % of the base resin.

If the aromatic vinyl-vinyl cyanide copolymer is less than 20 wt %, the moldability of the thermoplastic resin composition may be deteriorated, while if it exceeds 30 wt %, the impact resistance of the molded article using the thermoplastic resin composition may be deteriorated.

(C) Polyethylene Terephthalate Resin

The polyethylene terephthalate resin according to the embodiment may be added together with a phosphate-based heat stabilizer to be described later to mitigate the appearance characteristics and impact resistance deterioration due to the inorganic filler.

In an embodiment, the polyethylene terephthalate resin may have an intrinsic viscosity of less than or equal to 1.0 dl/g, for example less than or equal to 0.9 dl/g, for example less than or equal to 0.8 dl/g, as measured according to ASTM D2857. When the intrinsic viscosity of the polyethylene terephthalate resin exceeds 1.0 dl/g, the appearance of a thermoplastic resin composition including the same and a molded article using the same may be deteriorated.

In an embodiment, the polyethylene terephthalate resin may have a weight average molecular weight of 10,000 to 80,000 g/mol, for example, 15,000 to 75,000 g/mol. When the weight average molecular weight of the polyethylene terephthalate resin satisfies the above range, the molded article using the thermoplastic resin composition may exhibit excellent appearance and impact resistance despite the addition of the inorganic filler.

The polyethylene terephthalate resin may be included in an amount of 1 to 10 wt %, for example 1 to 8 wt %, for example 1 to 6 wt %, based on 100 wt % of the base resin. When the polyethylene terephthalate resin is included in the above ranges, it is possible to alleviate deterioration in appearance characteristics and impact resistance due to an inorganic filler together with a phosphate-based heat stabilizer that will be described later.

On the other hand, if the polyethylene terephthalate resin is included in an amount of less than 1 wt %, the effect of improving the appearance of the molded article using the thermoplastic resin composition may be insufficient, while if it exceeds 10 wt %, various physical properties such as heat resistance, impact resistance, and appearance characteristics of the molded article using the thermoplastic resin composition may be deteriorated.

(D) Methyl Methacrylate-Butadiene-Styrene Graft Copolymer

The methyl methacrylate-butadiene-styrene graft copolymer according to an embodiment imparts impact resistance of the thermoplastic resin composition, while contributing to improvement of dimensional stability and appearance characteristics of a molded article using the thermoplastic resin composition.

In an embodiment, the methyl methacrylate-butadiene-styrene graft copolymer may have a core-shell structure including a shell by graft polymerization of methyl methacrylate and/or styrene to a core made of a butadiene-based rubbery polymer component.

The methyl methacrylate-butadiene-styrene graft copolymer according to an embodiment may be prepared by adding methyl methacrylate and/or styrene to a butadiene-based rubbery polymer, and performing a graft copolymerization using a conventional polymerization method such as emulsion polymerization and bulk polymerization.

The butadiene-based rubbery polymer may be selected from a butadiene rubbery polymer, a butadiene-styrene rubbery polymer, a butadiene-acrylonitrile rubbery polymer, a butadiene-acrylate rubbery polymer, and a mixture thereof.

The methyl methacrylate-butadiene-styrene graft copolymer may be included in an amount of 4 to 12 parts by weight, for example, 4 to 10 parts by weight, based on 100 parts by weight of the base resin.

The butadiene-based rubber polymer core may be included in an amount of 20 to 80 wt % based on 100 wt % of the methyl methacrylate-butadiene-styrene graft copolymer.

In addition, the methyl methacrylate-butadiene-styrene graft copolymer may desirably have an average particle diameter of the butadiene-based rubbery polymer ranging from 100 to 400 nm, and, for example, 120 to 380 nm.

If the methyl methacrylate-butadiene-styrene graft copolymer is included in an amount of less than 4 parts by weight, the impact resistance of the molded article using the thermoplastic resin composition may be lowered, while if it exceeds 12 parts by weight, dimensional stability and appearance characteristics of the molded article using the thermoplastic resin composition may be deteriorated.

(E) Phosphate-Based Heat Stabilizer

The phosphate-based heat stabilizer according to an embodiment prevents a thermal decomposition reaction of the polycarbonate resin from occurring in the preparation process of the thermoplastic resin composition and/or the manufacturing process of the molded article using the thermoplastic resin composition. In addition, when an inorganic filler is added in order to further enhance the dimensional stability of the thermoplastic resin composition, the thermal decomposition of the polycarbonate resin is prevented from accelerating by the metal ions contained in the inorganic filler. The thermal decomposition reaction of the polycarbonate resin is not desirable because various physical properties (impact resistance, dimensional stability, appearance) of the thermoplastic resin composition may be deteriorated. Thus, the phosphate-based thermal stabilizer imparts thermal stability to the thermoplastic resin composition by inhibiting thermal decomposition of the polycarbonate resin.

In addition, when the phosphate-based heat stabilizer is added together with the aforementioned polyethylene terephthalate resin, both the appearance characteristics and thermal stability of the thermoplastic resin composition may be maintained excellently, despite the addition and/or increase in the amount of the inorganic filler.

In an embodiment, as the phosphate-based heat stabilizer, dihydrogen phosphate, stearyl phosphate, trimethyl phosphate, triethyl phosphate, triphenyl phosphate, or a combination thereof may be used, and specifically stearyl phosphate may be used.

The phosphate-based heat stabilizer may be included in a relatively small amount based on 100 parts by weight of the base resin. Specifically, it may be included in an amount of 0.1 to 0.3 parts by weight, for example, 0.1 to 0.2 parts by weight.

When the phosphate-based heat stabilizer is out of the above range, various physical properties such as impact resistance and appearance characteristics of the thermoplastic resin composition and the molded article using the same may be rather deteriorated, and it may be difficult to balance target physical properties.

(F) Inorganic Filler

The inorganic filler according to an embodiment may improve dimensional stability of a molded article using a thermoplastic resin composition. The inorganic filler may be, for example, in the form of particulates or flakes. As a non-limiting example, mica, a quartz powder, titanium dioxide, silicate, or aluminosilicate may be used. In addition, for example, chalk, wollastonite, mica layered clay mineral, montmorillonite, especially montmorillonite in an organophilic form modified by ion exchange, talc, kaolin, zeolite, vermiculite, aluminum oxide, silica, magnesium hydroxide, aluminum hydroxide, glass flakes, or the like. Mixtures of different inorganic fillers may also be used.

Preferred examples according to an embodiment may be talc, mica, and a combination thereof, and more preferably talc.

The inorganic filler may have an average particle diameter (D50) measured by a laser particle size analyzer (Malvern Panalytical Ltd., Mastersizer 3000) of, for example, greater than or equal to 1 µm, for example, greater than or equal to 2 µm, for example, greater than or equal to 3 µm, and for example, less than or equal to 5 µm, for example, less than or equal to 4 µm, and for example, 1 to 5 µm, for example, 2 to 4 µm. When the average particle diameter of the inorganic filler is out of the above range, mechanical strength and appearance characteristics of the molded article using the thermoplastic resin composition may be deteriorated.

The inorganic filler may be included in an amount of, for example, greater than or equal to 25 parts by weight, for example, greater than or equal to 28 parts by weight, and for example, less than or equal to 35 parts by weight, for example, less than or equal to 32 parts by weight, and for example, 25 to 35 parts by weight, for example 28 to 35 parts by weight, for example 28 to 32 parts by weight. When the content of the inorganic filler is out of the above range, the dimensional stability, heat resistance, mechanical strength, and appearance characteristics of the thermoplastic resin composition and the molded article using the same may be deteriorated.

(G) Other Additives

In addition to the components (A) to (F), the thermoplastic resin composition according to an embodiment may further include one or more additives required in order to balance physical properties under conditions that maintain excellent heat resistance, impact resistance, dimensional stability, and appearance characteristics, or required according to final uses of the thermoplastic resin composition.

Specifically, the additives may include a flame retardant, a nucleating agent, a coupling agent, a glass fiber, a plasticizer, a lubricant, an antibacterial agent, a releasing agent, an antioxidant, a ultraviolet stabilizer, an antistatic agent, a pigment, a dye, etc., and these may be used alone or in a combination of two or more.

These additives may be appropriately included within a range that does not impair the physical properties of the thermoplastic resin composition, and specifically, may be included in an amount of less than or equal to 20 parts by weight based on 100 parts by weight of the base resin, but is not limited thereto.

The thermoplastic resin composition according to the present invention may be prepared by a known method for preparing a thermoplastic resin composition.

For example, the thermoplastic resin composition according to the present invention may be prepared in the form of pellets by simultaneously mixing the components of the present invention and other additives and then melt-kneading in an extruder.

A molded article according to an embodiment of the present invention may be manufactured from the aforementioned thermoplastic resin composition. The thermoplastic resin composition has excellent heat resistance, impact resistance, dimensional stability, and appearance, and may be widely applied to the molding of various products used for painting or non-painting due to excellent moldability. Specifically, it may be usefully used for applications such as automobile interior/exterior materials.

Hereinafter, preferred examples of the present invention will be described. These examples, however, are not in any sense to be interpreted as limiting the scope of the invention.

Examples 1 and 2 and Comparative Examples 1 to 6

The thermoplastic resin compositions of Examples 1 and 2 and Comparative Examples 1 to 6 were prepared according to the component content ratios shown in Table 1.

In Table 1, (A), (B), and (C) which are included in the base resin are expressed in weight percent (wt %) based on the total weight of the base resin, and (D), (D'), (E), and (F)

which are added to the base resin are expressed in parts by weight based on 100 parts by weight of the base resin.

The components shown in Table 1 were dry-mixed, and quantitatively and continuously put into the feeding section of a twin-screw extruder (L/D=29, (1)=45 mm), and melted/kneaded. At this time, the barrel temperature of the twin screw extruder was set to 250° C. Subsequently, after drying the pelletized thermoplastic resin compositions at about 100° C. for about 2 hours through a twin screw extruder, specimens for measuring physical properties, 50 mm (horizontal)×200 mm (vertical) specimens for verifying the appearance having 3 mm thickness, and 10 mm (horizontal)×15 mm (vertical) specimens for verifying the dimensional stability having 3 mm thickness were injection-molded, respectively, using a 6 oz injection molding machine set to a cylinder temperature of about 290° C. and a mold temperature of about 60° C.

EXPERIMENTAL EXAMPLES

The experimental results are shown in Table 2.

(1) Impact resistance (kgf·cm/cm): A notched Izod impact strength was measured at room temperature (23° C.) according to ASTM D256 for a ⅛"-thick specimen.

(2) Dimensional stability (μm/m·° C.): After removing the stress from the specimen for dimensional stability verification in a range of −50° C. to 130° C. using a thermomechanical analysis device (TA Instruments, Q400) in a direction of the resin flow, a coefficient of linear expansion was measured in a temperature range of 40° C. to 40° C. As the coefficient of linear expansion is lower, the dimensional stability is better.

(3) Initial appearance: For specimens for verifying an appearance, it was evaluated by an area of gas generated in a standard area (50 mm width×50 mm height) centered on an

TABLE 1

|  |  | Ex. 1 | Ex. 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| Base | (A) | 70 | 70 | 70 | 70 | 70 | 70 | 60 | 70 |
| resin | (B) | 28 | 26 | 26 | 26 | 30 | 30 | 28 | 28 |
|  | (C) | 2 | 4 | 4 | 4 | — | — | 12 | 2 |
| (D) |  | 8 | 8 | 8 | — | 8 | 8 | 8 | 8 |
| (D') |  | — | — | — | 8 | — | — | — | — |
| (E) |  | 0.1 | 0.1 | — | 0.1 | 0.1 | 0.1 | 0.1 | 6 |
| (F) |  | 30 | 30 | 30 | 30 | 30 | 20 | 30 | 30 |

Descriptions of each component in Table 1 are as follows.

(A) Polycarbonate Resin

Polycarbonate resin having a melt flow index of about 18 g/10 min measured under the condition of 300° C. and 1.2 kg load according to ASTM D1238 standard (Lotte Advanced Materials Co., Ltd.)

(B) Aromatic Vinyl-Vinyl Cyanide Copolymer

Styrene-acrylonitrile copolymer (Lotte Advanced Materials Co., Ltd.) having a weight average molecular weight of about 100,000 g/mol copolymerized from a monomer mixture including about 28 wt % of acrylonitrile and about 72 wt % of styrene (C) Polyethylene Terephthalate Resin Polyethylene terephthalate resin (BCN76, Lotte Chemical Corp.) having an intrinsic viscosity of about 0.8 dl/g measured according to ASTM D2857

(D) Methyl Methacrylate-Butadiene-Styrene Graft Copolymer

Methyl methacrylate-butadiene-styrene graft copolymer (C223-A, MRC) having a core-shell structure obtained by graft polymerization of methyl methacrylate on a butadiene-styrene rubber polymer core (D') Acrylonitrile-Butadiene-Styrene Graft Copolymer Acrylonitrile-butadiene-styrene graft copolymer (Lotte Advanced Materials Co., Ltd.) having a core-shell structure including about 45 wt % of a butadiene rubbery polymer core having an average particle diameter of about 300 nm, and the shell is styrene-acrylonitrile copolymer in which styrene and acrylonitrile are grafted in a weight ratio of about 7:3.

(E) Phosphate-based Heat Stabilizer

Stearyl Phosphate (Adeka Corp.)

(F) Inorganic Filler

Figure 1:
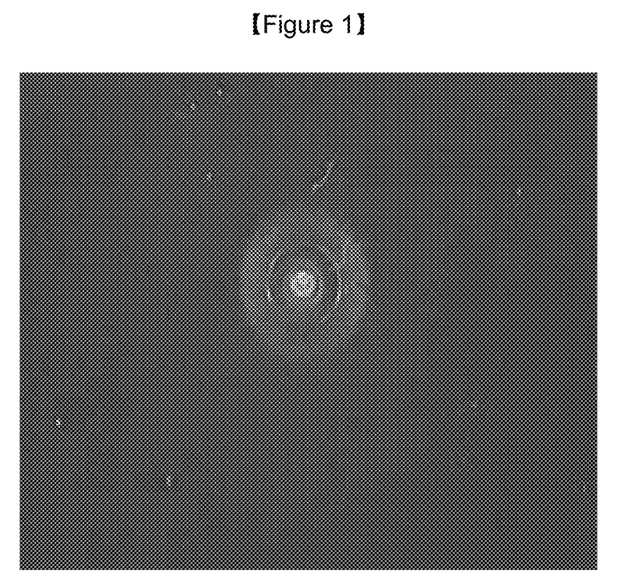
FIGS. 1 to 3 are images for showing the criteria for evaluating initial appearance of molded article specimens using the thermoplastic resin composition according to an embodiment, respectively, Grade 1 (FIG. 1), Grade 2 (FIG. 2), and Grade 3 (FIG. 3)
Figure 2:
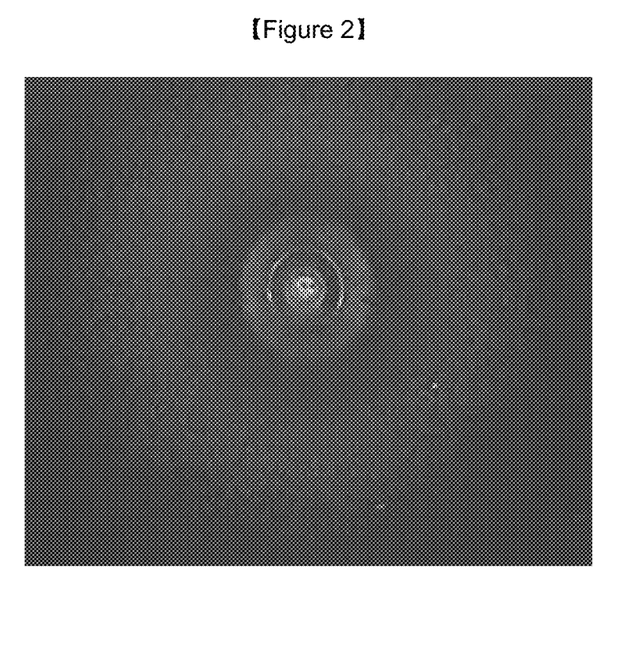
Figure 3:
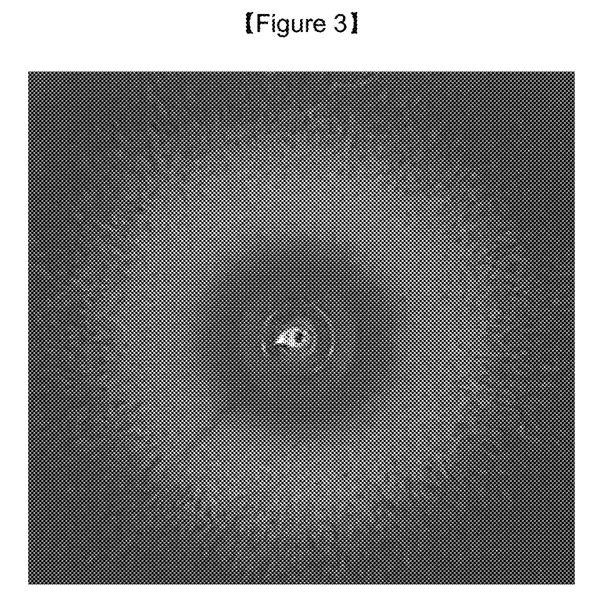

Talc (Imerys S.A.) having an average particle diameter (D50) of about 3.9 μm measured by a laser particle size analyzer (Malvern Panalytical Ltd., Mastersizer 3000)

injection gate located in the center of upper end of the specimen as in images shown in FIGS. 1 to 3. It was specifically classified as follows: Grade 1 when no gas was generated in a standard area, Grade 2 when gas was generated in less than or equal to ¼ of the standard area, and Grade 3 when gas was generated in greater than ¼ of the standard area.

FIGS. 1 to 3 are images for showing the criteria for evaluating initial of molded article specimens using the thermoplastic resin composition according to an embodiment, respectively, Grade 1 (FIG. 1), Grade 2 (FIG. 2), and Grade 3 (FIG. 3).

(4) Thermal stability appearance: For the specimens for appearance verification obtained by injection-molding after the resin composition pellets were kept in the cylinder of the injection molding machine set at the cylinder temperature of 290° C. for 4 minutes, it was evaluated as the area of the gas generated in the standard area (50 mm width×50 mm height) centered on an injection gate in the center of upper end of the specimen as shown in the images shown in FIGS. 4 to 6. It was specifically classified as follows: Grade 1 when no gas was generated in a standard area, Grade 2 when gas was generated in less than or equal to ½ of the standard area, and Grade 3 when gas was generated in greater than ½ of the standard area.

Figure 4:
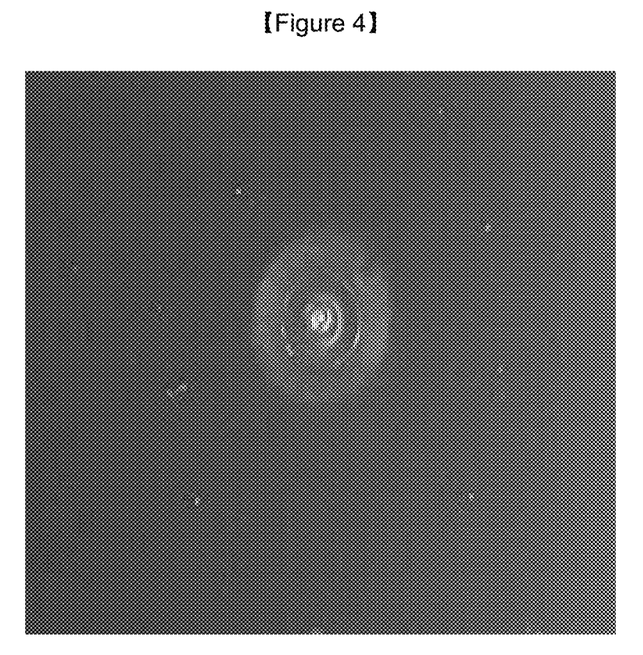
FIGS. 4 to 6 are images for showing the criteria for evaluating the thermal stability appearance of molded article specimens using a thermoplastic resin composition according to an embodiment, respectively, Grade 1 (FIG. 4), Grade 2 (FIG. 5), and Grade 3 (FIG. 6).
Figure 5:
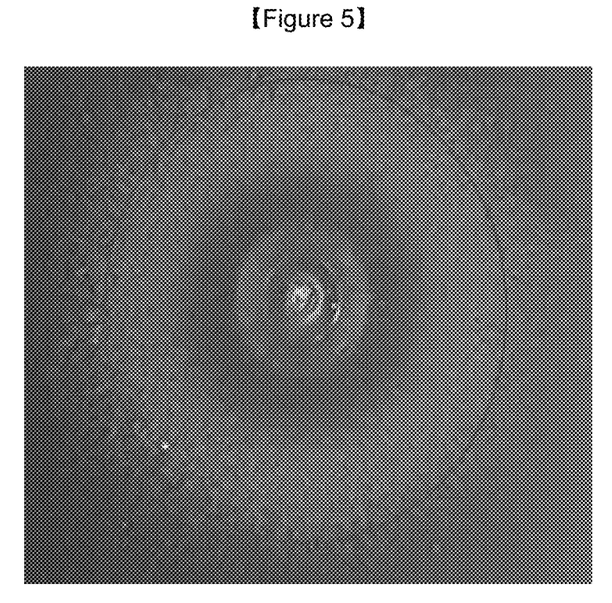
Figure 6:
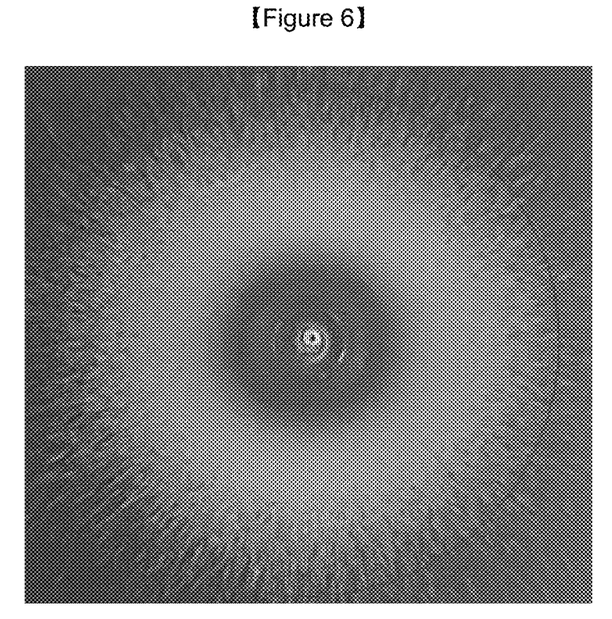

FIGS. 4 to 6 are images for showing the criteria for evaluating the thermal stability appearance of molded article specimens using a thermoplastic resin composition according to an embodiment, respectively, Grade 1 (FIG. 4), Grade 2 (FIG. 5), and Grade 3 (FIG. 6).

(5) Heat resistance (° C.): The heat deflection temperature (HDT) was measured under 18.5 kg load condition according to ASTM D648.

TABLE 2

|  | Ex. 1 | Ex. 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Impact strength | 6 | 6 | 5 | 6 | 6 | 10 | 4 | 4 |
| Coefficient of linear expansion | 40 | 40 | 40 | 40 | 40 | 45 | 40 | 40 |
| Initial appearance | 1 | 1 | 3 | 2 | 2 | 1 | 1 | 3 |
| Thermal stability appearance | 2 | 1 | 3 | 3 | 3 | 2 | 1 | 3 |
| Heat deflection temperature | 118 | 117 | 118 | 118 | 118 | 118 | 108 | 113 |

From Tables 1 and 2, the thermoplastic resin compositions and the molded articles using the same exhibited excellent impact resistance, heat resistance, dimensional stability, and appearance characteristics by using the polycarbonate resin, aromatic vinyl-vinyl cyanide copolymer, polyethylene terephthalate resin, methyl methacrylate-styrene-acrylonitrile graft copolymer, phosphate-based heat stabilizer, and inorganic filler in the optimal contents. As described above, the present invention has been described through preferred embodiments, but a person having ordinary skill would understand easily that the present invention is not limited thereto, and various modifications and variations may be possible without departing from the concept and scope of the following claims.

The invention claimed is:

1. A thermoplastic resin composition, comprising
100 parts by weight of a base resin which comprises
(A) 65 to 75 wt % of a polycarbonate resin;
(B) 20 to 30 wt % of an aromatic vinyl-vinyl cyanide copolymer; and
(C) 1 to 10 wt % of a polyethylene terephthalate resin, and
(D) 4 to 12 parts by weight of a methyl methacrylate-butadiene-styrene graft copolymer;
(E) 0.1 to 0.3 parts by weight of a phosphate-based heat stabilizer; and
(F) 25 to 35 parts by weight of an inorganic filler having an average particle diameter (D50) of 1 to 5 μm based on 100 parts by weight of the base resin.

2. The thermoplastic resin composition of claim 1, wherein the (A) polycarbonate resin has a melt flow index of 15 to 25 g/10 min measured under the condition of 300° C. and 1.2 kg load according to ASTM D1238.

3. The thermoplastic resin composition of claim 1, wherein the (B) aromatic vinyl-vinyl cyanide copolymer is a copolymer of a monomer mixture including 60 to 80 wt % of an aromatic vinyl compound and 20 to 40 wt % of a vinyl cyanide compound.

4. The thermoplastic resin composition of claim 1, wherein the (B) aromatic vinyl-vinyl cyanide copolymer has a weight average molecular weight of 80,000 to 200,000 g/mol.

5. The thermoplastic resin composition of claim 1, wherein the (B) aromatic vinyl-vinyl cyanide copolymer is a styrene-acrylonitrile copolymer.

6. The thermoplastic resin composition of claim 1, wherein the (C) polyethylene terephthalate resin has an intrinsic viscosity measured according to ASTM D2857 of less than or equal to 1.0 dl/g.

7. The thermoplastic resin composition of claim 1, wherein the (D) methyl methacrylate-butadiene-styrene graft copolymer comprises a core composed of a butadiene-based rubbery polymer, and a shell formed by graft polymerization of methyl methacrylate and/or styrene on the core.

8. The thermoplastic resin composition of claim 7, wherein the (D) butadiene-based rubbery polymer of the (D) methyl methacrylate-butadiene-styrene graft copolymer has an average particle diameter of 100 to 400 nm.

9. The thermoplastic resin composition of claim 1, wherein the (E) phosphate-based heat stabilizer comprises dihydrogen phosphate, stearyl phosphate, trimethyl phosphate, triethyl phosphate, triphenyl phosphate, or a combination thereof.

10. The thermoplastic resin composition of claim 1, wherein the (F) inorganic filler comprises montmorillonite, talc, kaolin, zeolite, vermiculite, aluminum oxide, silica, magnesium hydroxide, aluminum hydroxide, glass flakes, or a combination thereof.

11. The thermoplastic resin composition of claim 1, which further comprises at least one additive selected from a flame retardant, a nucleating agent, a coupling agent, a glass fiber, a plasticizer, a lubricant, an antibacterial agent, a release agent, an antioxidant, an ultraviolet stabilizer, an antistatic agent, a pigment, and a dye.

12. A molded article using the thermoplastic resin composition of claim 1.

* * * * *